F. W. HUDSON.
GATE VALVE.
APPLICATION FILED APR. 1, 1912.

1,149,057.

Patented Aug. 3, 1915.
2 SHEETS—SHEET 1.

WITNESSES:
R. W. Ewing
Leslie S. Williams

INVENTOR.
Frank W. Hudson.
BY
ATTORNEY.

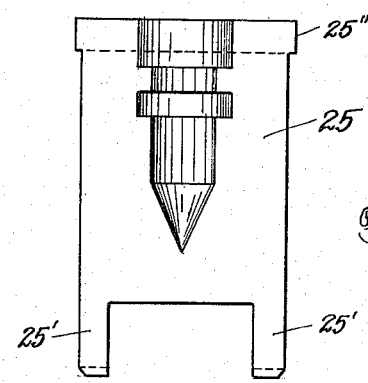
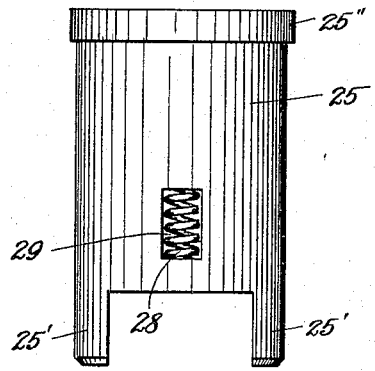
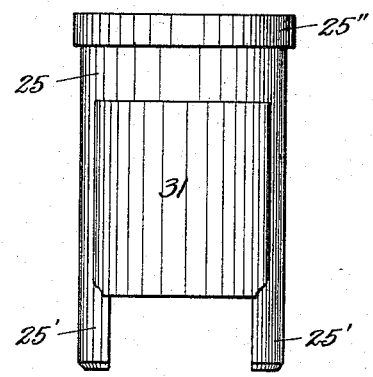

UNITED STATES PATENT OFFICE.

FRANK W. HUDSON, OF SHARON, PENNSYLVANIA, ASSIGNOR, BY DIRECT AND MESNE ASSIGNMENTS, TO HORACE W. DAVIS, OF SHARON, PENNSYLVANIA.

GATE-VALVE.

1,149,057.  Specification of Letters Patent.  Patented Aug. 3, 1915.

Application filed April 1, 1912. Serial No. 687,800.

*To all whom it may concern:*

Be it known that I, FRANK W. HUDSON, citizen of the United States, residing at Sharon, in the county of Mercer and State of Pennsylvania, have invented certain new and useful Improvements in Gate-Valves, of which the following is a specification.

This invention relates to valves of the type known as gate valves.

One of the objects of this invention is the provision of such a valve with means for protecting the valve gate proper from the action of the fluid controlled by the valve.

A further object is the provision of such a valve with seats which, while the valve is opened, are protected from the action of the fluid passing through the valve.

A still further object is to obtain a valve of this type which, when opened, affords a smooth unobstructed passage without recesses to the fluid passing through it, whereby the valve might be clogged with dirt or foreign substances.

Still further objects and purposes of this invention will appear from the drawings, the specifications describing the same, and the claims appended thereto in which are more fully set forth the arrangement of parts, combination of elements and specific structural details properly comprised within the scope of the same.

Figure 1:
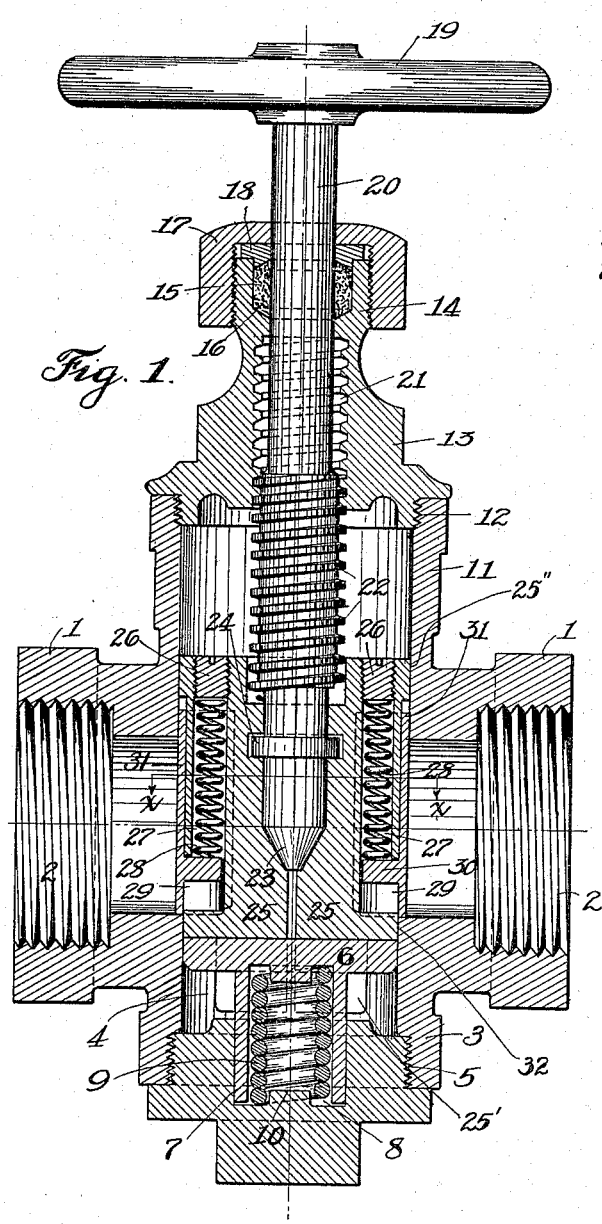
Figure 2:
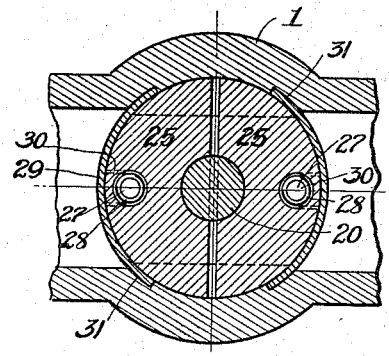
Figure 3:
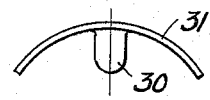
Figure 4:
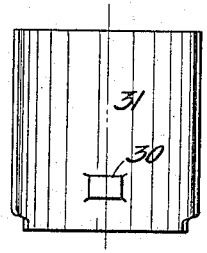

In the drawing in which is illustrated one of the possible embodiments of my invention, Figure 1 is a side cross sectional elevation of my gate valve, when closed, showing the gate members pressing the protector below the valve seat and the protector shields abutting against the valve seat, the gate members being pressed against the seats by the action of the tapered valve stem. Fig. 2 is a horizontal cross section taken on the line XX of Fig. 1 and showing the relative arrangement of the gate members, shield springs and shields. Fig. 3 is a plan view of one of the shields. Fig. 4 is a rear elevation of one of the shields showing lug thereon. Fig. 5 represents the flat side of one of the gate members, showing the tapered cavity for the stem and collar. Fig. 6 is an elevation of the curved side of the gate member showing the slot for the reception of the shield lug with the spring thereon. Fig. 7 is the same view as Fig. 6 showing the position of the shield relative to the gate member when the lug is at the bottom of the slot.

Referring now to the several figures in which like reference characters designate like parts, (1) is the valve body proper, provided with threads (2) for pipe connection thereto.

(3) is the plug seat in which the bottom plug (5) is screwed.

(4) is a cavity within the lower portion of the valve which will be referred to as a protector cavity.

The seat protector (6) is provided with a stem (7) which, as shown, is hollow and contains within it the spring (9) which is seated on the spring seat (8) and extending up from which into the spring is the boss (10). The upper part of the valve comprises the bonnet seat (11) having its upper inner portion threaded at (12) for the reception of the bonnet (13). At the upper portion of this bonnet is the stuffing box (14) provided with packing (15). At the top of this is the gland (18) held in place by the gland nut or cap (17). The present valve which is of the rising stem variety is provided with the stem (20) having at its upper end the hand wheel (19). The bonnet is provided with female threads (21) in which the male threads (22) of the stem engage. The rear portion of this stem is tapered in shape as at (23) and between the tapered and threaded portions is provided with the collar (24).

We come now to the peculiar construction of the valve gate proper.

(25) designates a two membered valve gate, each member being provided with lateral extensions (25'). The inner and upper portion of these valve gates is provided with a recess adapted to fit loosely about the collar (24) of the stem. As will be noted from the detailed views of these gate members, each in cross section represents a semi-circle, and as shown in the side elevation, the combined gates have a circular flange extending outwardly around the upper portion, as at (25''). Each gate member is at its outer central portion provided with a spring cavity (27) closed at the top by a plug (26) and having therein a spring (28). Cutting into this cavity from the lower portion of the gate is a slot (29). As better illustrated in Figs. 3 and 4, a shield (31) of the same curvature as the gate and of equal thickness with the gate flange covers the outer portion of each gate. The shield is provided with a lug (30) extending into a slot (29) and on which the shield spring (28) rests. The valve seat (32), which is of a diameter equal to that of the protector (6) is flush with the inner side of the shield member.

In operation, my valve works as follows:—
Beginning with the position of the members as shown in Fig. 1, upon turning the hand wheel to the left, the stem (20) rises and the top of the collar (24) engages the top of the gate cavity drawing the valve gate members upwardly. During the initial movement of the valve gate, the shield spring, pressing upon the shield lug, maintains the bottom of the shields against the valve seat and the shields do not rise until the bottom of the gate slot comes in contact with the shield lug, preventing further relative movement between the shield and the gate and drawing the shield upwardly with the gate; the bottom of the shield now being flush with the lower side of the gate members. At the same time as the gate member has been moving upwardly, the protector (6) impelled by the spring (9) moves up until it is flush with the valve seat (32), thus presenting a flat continuous bottom surface through the valve. The lateral extensions (25') which, where they have a bearing on the side of the protector, are flat, continue on upwardly with the valve gate and when the gate has reached its maximum height still engage the sides of the protector. Reversing the operation, when the hand wheel is turned to the right, the stem moves downwardly carrying with it the valve gate. The lateral extensions on the gate members move down relative to the protector. The protector remains flush with the bottom of the valve passage until the bottom surface of the gate comes in contact with it. Simultaneously, the bottom of each shield contacts with and covers the valve seat. The valve gate now continuing downward, the shields remain stationary, the shield spring (28) becoming tensioned, while the protector (6), in opposition to its spring, moves downward allowing the gate members to pass down into the valve seat. When the protector extension contacts with the bottom gate all further downward movement of the protector and valve gate is stopped, but by reason of the tapered valve stem fitting into a corresponding recess in the two membered gate, the two members are forced apart and against the valve seat, thus tightening the connection.

It will thus be seen that when the valve is closed all surfaces which while the valve is open are exposed to the fluids are doubly shielded and protected from such fluid. Moreover, by reason of the movable protecting member (6) coming flush with the bottom of the valve passage while the valve is opened, no dirt or foreign substances can accumulate thus eliminating frequent cleaning of the valve.

When the valve is opened, the valve seat as to its side is protected by the downward extensions (25') on the gate members. As to the remainder, as before explained, the protector (6) is effective. The cross section of the opening of the valve at right angles to the fluid flow is therefore rectangular, the flat bottom of the gate members supplying the top and the flat top of the protector (6) being the bottom, while the sides are formed by the straight downward extensions (25') of the gate members.

I claim:—

1. A gate valve having a seat therein, means operative to protect the whole of said seat while the valve is open, and other means operative to protect the whole of said seat when the valve is closed.

2. In a gate valve, having a seat therein, the combination with the seat of two alternatively operative means protecting the whole of the seat.

3. In a gate valve, the combination of a seat and a plurality of means for protecting the whole of the valve seat, either one of said means being inoperative during the operation of the other.

4. In a gate valve having a direct fluid passage, the combination of a seat, a gate fitting therein, and means for protecting the gate and seat while the valve is being opened.

5. In a gate valve, the combination of a seat and a gate coöperative therewith, and means operative when the valve is open to protect said gate, and when the valve is closed to protect the gate and seat.

6. In a gate valve having a seat and a gate coöperative therewith to close the valve, the combination of means for protecting said seat and other means for protecting said gate, both of said means being operative while the valve is being opened.

7. In a gate valve having a seat and a gate coöperative therewith to close the valve, the combination of means for protecting said seat and other means for protecting said gate, both of said means being operative while the valve is open, said latter means being operative when the valve is closed.

8. In a gate valve having a seat and gate coöperative therewith, the combination of a seat protector and gate protectors, said protectors having vertical movement during the closing of the valve.

9. In a gate valve having a seat and gate coöperative therewith, the combination of members on said gate operative to protect a portion of the seat when the gate is opened or closed, and other members coöperative with the gate to protect the other portions of the seat only when the valve is closed.

10. In a gate valve having a seat and gate coöperative therewith, the combination of gate members, protectors therefor, lateral extensions on said gates, and a movable member coöperative with said gate members and extensions to afford a straightaway rectangular fluid passage when the valve is in any open position.

11. In a gate valve having a seat and gate coöperative therewith, the combination of members positioned on the gate and adapted to move relatively thereto, a member within the seat and adapted to move relatively thereto, and springs operative to move all of said members when the valve is opened.

12. In a gate valve, the combination of a gate comprising a plurality of members, protectors on said gate, a valve stem having loose motion within and between said members, a valve seat, a movable protector within the valve seat, said valve stem resting in a tapered cavity in the gate members whereby the gate members are moved relative to the valve seat and to the protector during the rotation of the valve stem.

13. In a gate valve having a straightaway fluid passage, a gate, a seat comprising bottom and side portions and members adapted to move to a flush position with all of the said portions when the valve is open, whereby the whole of said seat and members coöperate to protect each other from the action of the fluid passing through the valve.

In testimony whereof I affix my signature in presence of two witnesses.

FRANK W. HUDSON.

Witnesses:
C. H. HOAR,
EUGENE E. ANDERSON.

Copies of this patent may be obtained for five cents each, by addressing the "Commissioner of Patents, Washington, D. C."